2,864,859

PREPARATION OF ORGANIC ACIDS HAVING A TERTIARY OR QUATERNARY ALPHA CARBON ATOM

Abraham Schneider, Overbrook Hills, Pa., assignor to Sun Oil Company, Philadelphia, Pa., a corporation of New Jersey No Drawing. Application January 23, 1956
Serial No. 560,873

11 Claims. (Cl. 260—515)

This invention relates to the preparation of organic acids, and more particularly relates to the preparation of organic acids having a tertiary or quaternary alpha carbon atom.

Organic acids having a tertiary or quaternary alpha carbon atom, which may be for example a trisubstituted acetic acid, such as 2,2-dimethylpropanoic acid (pivalic acid), have heretofore been prepared such as from tertiary butyl cyanide, or from a Grignard reagent and carbon dioxide, or from carbon monoxide and an olefin reacted in vapor phase at elevated temperatures and pressures. The preparation of trisubstituted acetic acids having higher alkyl radicals as substituents are difficult to prepare although certain methods have been described. For example, a procedure has been described which involves introducing a tertiary group into a furan nucleus and then oxidizing to split the ring and yield the desired trisubstituted acetic acid. Such procedures are difficult, require expensive reagents and/or reactants, and frequently result in only a small yield of the desired product.

It has now been found that certain alkyl substituted aromatic hydrocarbons can be reacted directly with carbon monoxide by subjecting a mixture of the aromatic hydrocarbon and carbon monoxide to the simultaneous action of an olefin-acting material and a strong acid such as hydrogen fluoride. According to the invention, when a strong acid such as hydrogen fluoride and an olefin-acting material are brought together, in liquid phase, in the presence of carbon monoxide and an alkyl substituted aromatic hydrocarbon containing a secondary or tertiary carbon atom attached to the aromatic nucleus, a catalytic condition is established which is effective to cause the carbon monoxide to react with the aromatic hydrocarbon. On hydrolysis of the reaction mixture, an acid is obtained in which the alpha carbon atom is a tertiary or quaternary carbon atom, i. e., a di- or trisubstituted acetic acid is formed as the product.

The mechanism of the reaction is complicated and not fully understood. The overall reaction, however, can be illustrated by the equation:

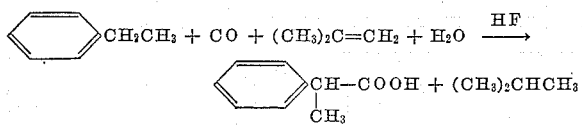

in which ethylbenzene, isobutylene, and hydrogen fluoride are used to illustrate the alkyl substituted aromatic hydrocarbons, olefin-acting materials and acidic catalysts, respectively, which can be employed. It will be noticed that isobutane is a product, and it has been found characteristic of the reaction that a substantial proportion of the olefin-acting material employed is converted to the corresponding paraffin. It is also characteristic of the reaction that the substituted acetic acid product has one more carbon atom than the aromatic hydrocarbon reactant. A further characteristic of the process is that substantially no alkyl fluorides are formed. Another characteristic is that the reaction occurs substantially instantaneously, i. e., the reaction is complete as soon as the reactants are mixed.

For convenience the process of the invention is herein largely described using ethylbenzene as the aromatic hydrocarbon, isobutylene as the olefin-acting material and hydrogen fluoride as the catalyst, as required by the process, but the scope of the invention is not limited to such specific materials.

In practicing the invention, it is preferred to prepare an emulsion of ethylbenzene and carbon monoxide in hydrogen fluoride, and to contact this emulsion with isobutylene, such as by introducing isobutylene into the emulsion. However, the reactants may be otherwise contacted, such as by continuously contacting a stream of ethylbenzene and hydrogen fluoride with a stream of carbon monoxide admixed with isobutylene, or by simultaneously but separately introducing carbon monoxide and isobutylene into an emulsion of ethylbenzene in hydrogen fluoride, it being necessary only that the olefin and hydrogen fluoride be contacted only in the presence of both the ethylbenzene and the carbon monoxide. After reaction between the carbon monoxide and isopentane, the acid layer is separated and water added thereto, at a temperature of from 0° C. to 100° C., to hydrolyze the reaction product to the organic acid. The so-formed acid is then separated as the product of the process.

Alkyl substituted aromatic hydrocarbons which can be employed in the process have a secondary or tertiary carbon atom attached to the aromatic nucleus. When the carbon atom attached to the aromatic nucleus is a secondary carbon atom, the product is a di-substituted acetic acid, i. e., the alpha carbon atom of the acetic acid product is a tertiary carbon atom. If the alkyl substituted aromatic hydrocarbon has a tertiary carbon atom attached to the aromatic nucleus, the alpha carbon atom of the acetic acid product is a quaternary carbon atom. The alkyl substituent on the aromatic nucleus can be in the form of a cycloalkyl group which may be fused to the aromatic nucleus, such as in 1,2,3,4, tetrahydronaphthalene, or a single carbon atom of the cycloalkyl group can be attached to a carbon atom of the aromatic nucleus, such as in cyclohexylbenzene. Suitable alkyl aromatics in which the carbon atom attached to the aromatic nucleus is a secondary carbon atom include, for example, ethylbenzene, n-propylbenzene, n-butylbenzene, 1-phenyl-2-methylpropane, 1-phenyl-3-methylbutane, 1-phenyl-2-ethylbutane, and homologues and isomers thereof. Suitable alkyl aromatics having a tertiary carbon atom attached to a carbon atom of the aromatic nucleus include, for example, isopropylbenzene, secondary butylbenzene, 1-phenyl-1-ethylbutylene, 1-phenyl-1-ethylpentane, and homologues and isomers thereof. Suitable alkyl aromatics in which a cycloparaffinic group is fused to the aromatic nucleus include, for example, 1,2,3,4, tetrahydronaphthalene, fluorene, 9,10-dihydroanthracene, 1,2,3,4,-tetrahydroanthracene and indan. Other aromatics such as diphenylmethane, triphenylmethane, 1,1-diphenylethane, and the like also can be used with good results. Where the alkyl group attached to a carbon atom of the aromatic nucleus through a secondary or tertiary carbon atom has a tertiary carbon atom not so attached, reaction with carbon monoxide may be at either or both of such carbon atoms to form a mixture of acids including the dicarboxylic acid. It is preferred to employ alkyl aromatic hydrocarbons having a total of not more than 30 carbon atoms per molecule to obtain good results in the process.

Mixtures of the alkyl aromatics above described can be used with good results, a mixture of acids corresponding to the alkyl aromatics present being obtained. Petroleum fractions containing a major proportion of such alkyl aromatics give good results. A petroleum fraction may be used to supply both the alkyl aromatic hydrocarbon and the olefin required in the process as herein described.

The olefin-acting material to employ must have at least one tertiary carbon atom per molecule. Tertiary olefins, tertiary alkyl halides and tertiary alcohols can be used but are not necessarily equivalent under all reaction conditions. Tertiary olefins, i. e., olefins which have one olefinic double bond attached to a tertiary carbon atom are preferred. Suitable tertiary olefins include, for example, isobutylene, 2-methylbutene-1, 2-methylbutene-2, 2-methylpentene-1, 2-methylpentene-2, 3-ethylpentene-2, 2-methyldecene-1, 1-methylcyclopentene, 1-methylcyclohexene, and homologues and isomers thereof. It is preferred to employ a tertiary olefin having a total of not more than about 10 carbon atoms per molecule, but olefins having up to about 20 carbon atoms per molecule are operable. When using a tertiary olefin, a strong acid catalyst gives excellent results. Hydrogen fluoride is the preferred catalyst, but other strong acids such as sulfuric, hydrated boron trifluoride and fluosulfonic acid give good results.

Tertiary alkyl halides which can be used as the olefin-acting materials include tertiary alkyl chlorides and fluorides. With such alkyl halides it is preferred to use as the acid catalyst a Friedel-Crafts catalyst having a halogen atom which is the same as the halogen atom of the alkyl halide. Thus, it is preferred to use boron trifluoride or hydrogen fluoride with alkyl fluorides, or to use aluminum trichloride with alkyl chlorides. Suitable alkyl chlorides and fluorides include, for example, tertiary butyl chloride and fluoride, tertiary amyl chlorides and fluorides, their hexyl, heptyl, octyl, nonyl and decyl homologues and isomers, 1-methyl-1-fluorocyclohexane, 1-methyl-1-fluorocyclopentane, and the like. It is preferred to employ an alkyl halide having not more than about 10 carbon atoms per molecule, but alkyl halides having up to about 20 carbon atoms per molecule are operable.

Alcohols which can be used as the olefin-acting material are the tertiary monohydric alcohols, and with such alcohols are used a strong acid catalyst such as hydrogen fluoride or sulfuric acid. Tertiary alcohols which give good results include, for example, tertiary butyl alcohol, tertiary amyl alcohol, and the hexyl, heptyl, octyl, nonyl and decyl homologues and isomers thereof. It is preferred to use an alcohol having not more than about 10 carbon atoms per molecule but alcohols having up to about 20 carbon atoms per molecule are operable.

The quantities of reactants employed may be varied substantially and good results obtained. From 1 to 20 moles of the alkyl aromatic can be employed for each mole of olefin used, i. e., a mole ratio of alkyl aromatic to olefin of from 1:1 to 20:1 can be used, but preferably the mole ratio is within the range of from 2:1 to 5:1. The quantity of carbon monoxide employed should be at least equal to the quantity of olefin-acting material on a molar basis, but the pressure thereof must be less than 50 atmospheres, since at higher pressures reaction between the carbon monoxide and olefin-acting material becomes appreciable. The pressure must be at least sufficient to maintain liquid phase reaction.

The quantity of acid catalyst to employ can be advantageously varied, the optimum quantity depending on the particular acid being used and on the olefin-acting material employed. In general the quantity of acid catalyst will be such that the mole ratio of acid to olefin-acting material will be from 1:1 to 10:1, and preferably is from 3:1 to 7:1. The acid concentration in the acid layer must be maintained above 80% by weight, and preferably is maintained above 90% by weight of the acid layer. The quantity of water present in the acid layer must be below 10% by weight, and preferably is maintained below about 5% by weight of the acid layer.

The temperature of the reaction mixture can be varied within the range of from about $-120°$ C. to about $100°$ C., and preferably is maintained in the range of from about $0°$ C. to $50°$ C. In general, lower temperatures can be used with the combination of tertiary alkyl fluorides and boron trifluoride and in general with olefin-acting materials having a tertiary carbon atom. Temperatures in the higher portion of the staged range are advantageously used with olefin-acting materials having a secondary carbon atom and with the latter a reaction temperature of above about $20°$ C. is preferred.

Time is not considered a critical variable, since the carbonylation reaction proceeds practically instantaneously, i. e., the reaction is complete as soon as the reactants are brought together. Hence the time of contact is largely determined by practical considerations and will be usually from 1 to 60 minutes.

After separation of the acid layer from the organic layer, water is added to the acid layer to hydrolyze the reaction product, which may be for example an acid fluoride, to the corresponding organic acid. The temperature during hydrolysis should be from $0°$ C. to $100°$ C., and preferably is in the range of from $20°$ C. to $50°$ C. At least 1 mole of water should be added per mole of the reaction product, and preferably from about 2 to 5 moles of water per mole of reaction product is used. After hydrolysis the organic acid product can be recovered by any convenient means, such as by distillation.

In order to illustrate an embodiment in the process of the invention, about 3 moles of ethylbenzene and 5 moles of hydrogen fluoride are introduced into a contactor provided with a stirrer. With the temperature of the contactor regulated at about $20°$ C., separate streams of carbon monoxide and isobutylene are introduced therein during vigorous agitation over a period of about 10 minutes, the mole ratio of carbon monoxide to isobutylene during the introduction being maintained at about 1.5 to 1, and a total of about 2 moles of carbon monoxide being added. The pressure in the contactor is maintained below 30 atmospheres. After the introduction stirring was continued for about 5 minutes. The reaction mixture is allowed to separate into a lower acid layer and an upper hydrocarbon layer. The acid layer is separated and about 5 moles of water added thereto, at a temperature of about $20°$ C., to hydrolyze the reaction product to the organic acid. About 0.6 mole of alpha phenylpropanoic acid is recovered. From the separated organic layer, unreacted ethylbenzene is recovered and is advantageously recycled to the process. Isobutane in a quantity substantially equivalent to the quantity of isobutylene introduced is also recovered from the organic layer and may be further processed to valuable products or may be dehydrogenated to isobutylene and reused in the process.

The foregoing specific embodiment illustrates the process of the invention. When other alkyl aromatic hydrocarbons are substituted for ethylbenzene and/or other olefin-acting materials are substituted for isobutylene, and/or other catalysts are substituted for hydrogen fluoride, within the limits as described herein, substantially equivalent results are obtained.

The invention claimed is:

1. Process for preparing organic acids which comprises bringing together, in the liquid phase, an inorganic acid catalyst selected from the group consisting of hydrogen fluoride, sulfuric acid, hydrated boron trifluoride, and fluosulfonic acid and an olefin-acting material having a tertiary carbon atom and not more than 20 carbon atoms per molecule selected from the group consisting of tertiary olefins, tertiary alkyl fluorides, tertiary alkyl chlorides, and tertiary alcohols in the presence of carbon monoxide and an alkyl substituted aromatic hydrocarbon having the alkyl group attached to the aromatic nucleus by a carbon atom selected from the group consisting of tertiary carbon atoms and secondary carbon atoms and a total of not more than 30 carbon atoms per molecule, wherein the pressure of carbon monoxide is maintained below about 50 atmospheres and the mole ratio of said aromatic hydrocarbon to said olefin-acting material is from 1:1 to 20:1, separating an acid phase containing the reaction product of the carbon monoxide and said aromatic hydrocarbon from the reaction mixture, and hydrolyzing said recation product to form an organic acid having one more carbon atom than said aromatic hydrocarbon.

2. Process according to claim 1 wherein said olefin-acting material is a tertiary olefin.

3. Process according to claim 1 wherein said olefin-acting material is a tertiary alkyl chloride.

4. Process according to claim 1 wherein said olefin-acting material is a tertiary alkyl fluoride.

5. Process according to claim 1 wherein the olefin-acting material is a tertiary alcohol.

6. Process for preparing organic acids having a tertiary alpha carbon atom which comprises bringing together, in the liquid phase, an inorganic acid catalyst selected from the group consisting of hydrogen fluoride, sulfuric acid, hydrated boron trifluoride, and fluosulfonic acid and an olefin-acting material having a tertiary carbon atom and not more than 20 carbon atoms per molecule selected from the group consisting of tertiary olefins, tertiary alkyl fluorides, tertiary alkyl chlorides, and tertiary alcohols in the presence of carbon monoxide and an alkyl substituted aromatic hydrocarbon having the alkyl group attached to the aromatic nucleus by a secondary carbon atom and having a total of not more than 30 carbon atoms per molecule, wherein the pressure of carbon monoxide is maintained below about 50 atmospheres and the mole ratio of said aromatic hydrocarbon to said olefin-acting material is from 1:1 to 20:1, separating an acid phase containing the reaction product of the carbon monoxide and said aromatic hydrocarbon from the reaction mixture, and hydrolyzing said reaction product to form an organic acid having a tertiary alpha carbon atom and one more carbon atom than said aromatic hydrocarbon.

7. Process according to claim 6 wherein said alkyl substituted aromatic hydrocarbon is ethylbenzene.

8. Process according to claim 6 wherein said alkyl substituted aromatic hydrocarbon is n-propylbenzene.

9. Process for preparing organic acids having a quaternary alpha carbon atom which comprises bringing together, in the liquid phase, an inorganic acid catalyst selected from the group consisting of hydrogen fluoride, sulfuric acid, hydrated boron trifluoride, and fluorosulfonic acid and an olefin-acting material having a tertiary carbon atom and not more than 20 carbon atoms per molecule selected from the group consisting of tertiary olefins, tertiary alkyl fluorides, tertiary alkyl chlorides, and tertiary alcohols in the presence of carbon monoxide and an alkyl substituted aromatic hydrocarbon having the alkyl group attached to the aromatic nucleus by a tertiary carbon atom and having a total of not more than 30 carbon atoms per molecule, wherein the pressure of carbon monoxide is maintained below about 50 atmospheres and the mole ratio of said aromatic hydrocarbon to said olefin-acting material is from 1:1 to 20:1, separating an acid phase containing the reaction product of the carbon monoxide and said aromatic hydrocarbon from the reaction mixture, and hydrolyzing said reaction product to form an organic acid having a quaternary alpha carbon atom and one more carbon atom than said aromatic hydrocarbon.

10. Process according to claim 9 wherein said alkyl substituted aromatic hydrocarbon is isopropylbenzene.

11. Process according to claim 9 wherein said alkyl substituted aromatic hydrocarbon is secondary butylbenzene.

References Cited in the file of this patent
UNITED STATES PATENTS

| | | |
|---|---|---|
| 1,905,383 | Huppke et al. | Apr. 25, 1933 |
| 2,053,233 | Woodhouse | Sept. 1, 1936 |
| 2,426,870 | Hill | Sept. 2, 1947 |
| 2,517,898 | Linville | Aug. 8, 1950 |
| 2,570,793 | Gresham et al. | Oct. 9, 1951 |
| 2,580,070 | Brooks et al. | Dec. 25, 1951 |
| 2,710,878 | Glasebrook | June 14, 1955 |
| 2,710,879 | Snyder | June 14, 1955 |
| 2,737,536 | Bloch et al. | Mar. 6, 1956 |

FOREIGN PATENTS

| | | |
|---|---|---|
| 547,101 | Great Britain | Aug. 13, 1942 |

OTHER REFERENCES

Wagner et al.: Synthetic Organic Chemistry, John Wiley & Sons, Inc., New York (1953) p. 418.